United States Patent
Haynes et al.

(10) Patent No.: US 11,511,871 B2
(45) Date of Patent: Nov. 29, 2022

(54) MULTIPURPOSE READINESS INDICATOR FOR OFF-WING SLIDE RAFT

(71) Applicant: GOODRICH CORPORATION, Charlotte, NC (US)

(72) Inventors: Timothy C. Haynes, Prescott Valley, AZ (US); Hector M. Ontiveros, Phoenix, AZ (US)

(73) Assignee: Goodrich Corporation, Charlotte, NC (US)

( * ) Notice: Subject to any disclaimer, the term of this patent is extended or adjusted under 35 U.S.C. 154(b) by 586 days.

(21) Appl. No.: 16/580,814

(22) Filed: Sep. 24, 2019

(65) Prior Publication Data

US 2021/0086870 A1    Mar. 25, 2021

(51) Int. Cl.
| | | |
|---|---|---|
| B63B 7/08 | (2020.01) | |
| B64D 25/14 | (2006.01) | |
| B63C 9/04 | (2006.01) | |

(52) U.S. Cl.
CPC .............. B64D 25/14 (2013.01); B63B 7/085 (2013.01); B63C 9/04 (2013.01); *B63C 2009/042* (2013.01); *B63C 2009/044* (2013.01)

(58) Field of Classification Search
CPC ........... B64D 25/14; B63B 7/085; B63C 9/02; B63C 2009/026; B63C 9/03; B63C 2009/035; B63C 9/04; B63C 2009/042; B63C 2009/044; B63C 2009/046; B63C 2009/048
See application file for complete search history.

(56) References Cited

U.S. PATENT DOCUMENTS

| | | | | |
|---|---|---|---|---|
| 3,827,094 A | * | 8/1974 | Fisher ...................... | A62B 1/20 193/25 B |
| 3,833,088 A | * | 9/1974 | Chacko ................... | B64D 25/14 193/25 B |
| 4,332,049 A | * | 6/1982 | Fisher ...................... | A62B 1/20 182/47 |
| 4,333,546 A | | 6/1982 | Fisher | |
| 4,846,422 A | * | 7/1989 | Fisher .................... | B64D 25/14 193/25 B |
| 6,443,259 B1 | | 9/2002 | Oney et al. | |
| 10,112,684 B1 | | 10/2018 | Bahena et al. | |
| 10,131,440 B2 | | 11/2018 | Volny et al. | |
| 10,189,573 B2 | | 1/2019 | Haynes et al. | |
| 11,066,176 B2 | * | 7/2021 | Haynes ................. | B64D 25/14 |
| 11,192,658 B2 | * | 12/2021 | Haynes ................. | B64D 25/14 |
| 2018/0273191 A1 | | 9/2018 | Haynes et al. | |
| 2021/0221525 A1 | * | 7/2021 | Haynes ................. | B64D 45/00 |

* cited by examiner

*Primary Examiner* — Ajay Vasudeva
(74) *Attorney, Agent, or Firm* — Snell & Wilmer L.L.P.

(57) ABSTRACT

An inflatable slide may comprise a ramp portion and a slide portion extending from the ramp portion. A multipurpose indicator tube may be fluidly coupled to the slide portion. A releasable restraint may be disposed between the multipurpose indicator tube and the slide portion. The releasable restraint may comprise a first restraint portion coupled to an end of the multipurpose indicator tube and a second restraint portion coupled to a toe end of the slide portion. The first restraint portion may be releasably coupled to the second restraint portion. A detachable restraint may be coupled to the slide portion and configured to detachably couple to the end of the multipurpose indicator tube.

17 Claims, 10 Drawing Sheets

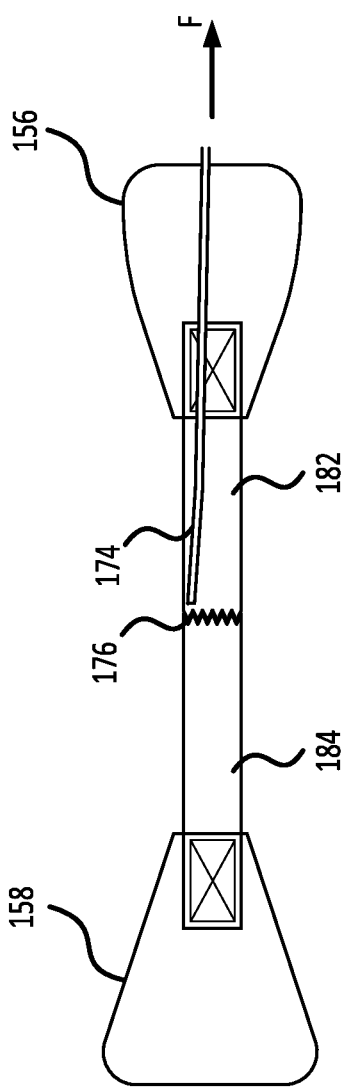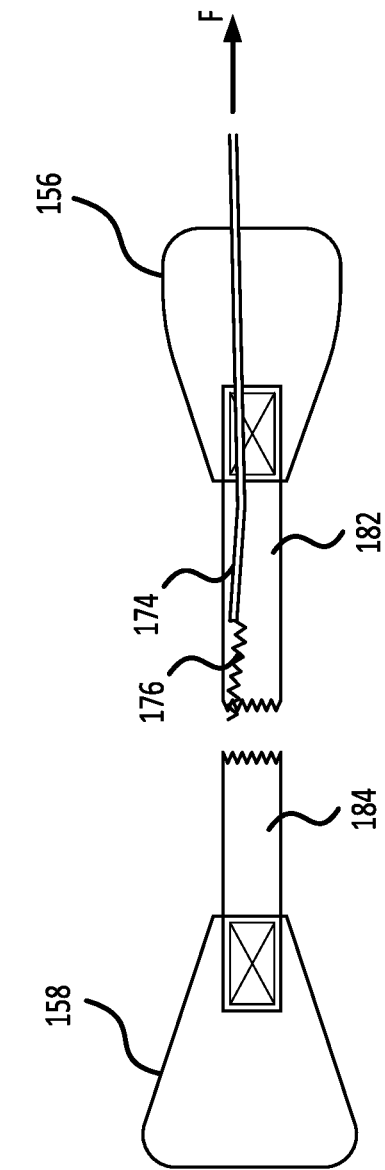

MULTIPURPOSE READINESS INDICATOR FOR OFF-WING SLIDE RAFT

FIELD

The present disclosure relates to emergency evacuation equipment for aircraft and, more specifically, to an off-wing evacuation slide having a multipurpose readiness indicator.

BACKGROUND

Aircraft evacuation systems, including inflatable evacuation slides, may be used to exit an aircraft absent a jet way or other suitable means of egress for passengers. In the event of a water landing, the inflatable evacuation slide may be employed as a life raft. Evacuation systems may deploy from the side of an aircraft fuselage, for example, or from over a wing of the aircraft, i.e., "off-wing."

A canopy for providing shelter, after a water landing, may be included with the evacuation system, as set forth by various governmental agencies. Current canopy designs tend to employ a waterproof canopy, which can be tied or otherwise secured to the slide/raft, and canopy support tubes configured to provide distance between the canopy and the sliding surface. The canopy supports tubes may be integral to the side rails of the slide/raft such that the support tubes inflate upon inflation of the slide or the canopy supports tubes may be distinct components that are manually attached to the slide and orally inflated by an evacuee. The support tubes tend to add extra weight to the evacuation system while serving a single purpose (i.e., canopy support). Further, inflating and/or attaching the support tubes can be difficult in high wind conditions.

SUMMARY

An inflatable slide is disclosed herein. In accordance with various embodiments, the inflatable slide may comprise a ramp portion and a slide portion extending from the ramp portion. A multipurpose indicator tube may be fluidly coupled to the slide portion. A releasable restraint may be disposed between the multipurpose indicator tube and the slide portion. The releasable restraint may comprise a first restraint portion coupled to a first end of the multipurpose indicator tube and a second restraint portion coupled to a toe end of the slide portion. The first restraint portion may be releasably coupled to the second restraint portion. A detachable restraint may be coupled to the slide portion and configured to detachably couple to the first end of the multipurpose indicator tube.

In various embodiments, a releasable support strap may be coupled between the ramp portion and the slide portion. A release assembly may be coupled to the releasable support strap. The releasable support strap may be configured to release tension from between the ramp portion and the slide portion such that an angle of the slide portion relative to the ramp portion changes in response to the release of tension from between the ramp portion and the slide portion. The ramp portion may remain affixed to the slide portion after the release of tension from between the ramp portion and the slide portion.

In various embodiments, the releasable support strap may comprise a first strap portion coupled to a second strap portion by a releasable connection system. In various embodiments, the detachable restraint may comprise at least one of a hook-and-loop type fastener, a snap-fastener, or lacing.

In various embodiments, the detachable restraint may be configured to detachably couple to the first restraint portion. In various embodiments, a second end of the multipurpose indicator tube may be coupled to a first longitudinal tube of the slide portion and the detachable restraint may be attached to a second longitudinal tube of the slide portion.

In various embodiments, the multipurpose indicator tube may be configured to form an arc extending between the first longitudinal tube and the second longitudinal tube. In various embodiments, the first restraint portion may be configured to decouple from the second restraint portion in response to an internal pressure of the slide portion exceeding a predetermined pressure threshold.

In various embodiments, the first end of the multipurpose indicator tube may be configured to pivot away from the first longitudinal tube in response to the first restraint portion decoupling from the second restraint portion.

An off-wing evacuation system is also disclosed herein. In accordance with various embodiments, the off-wing evacuation system may comprise an inflatable slide configured to be deployed from an aircraft. The inflatable slide may comprise a ramp portion and a slide portion extending from the ramp portion. A multipurpose indicator tube may be configured to pivot relative to the slide portion. A releasable restraint may be disposed between the multipurpose indicator tube and the slide portion. The releasable restraint may comprise a first restraint portion coupled to a first end of the multipurpose indicator tube and a second restraint portion coupled to a toe end of the slide portion. The first restraint portion may be releasably coupled to the second restraint portion. A detachable restraint may be coupled to the slide portion and configured to detachably couple to the first end of the multipurpose indicator tube. The off-wing evacuation system may further comprise a canopy configured to be coupled to the inflatable slide.

In various embodiments, a releasable support strap may be coupled between the ramp portion and the slide portion. A release assembly may be coupled to the releasable support strap. The releasable support strap may be configured to release tension from between the ramp portion and the slide portion such that an angle of the slide portion relative to the ramp portion changes in response to the release of tension from between the ramp portion and the slide portion. The ramp portion may remain affixed to the slide portion after the release of tension from between the ramp portion and the slide portion.

In various embodiments, the releasable support strap may comprise a first strap portion coupled to a second strap portion by a releasable connection system. The release assembly may further comprise a flexible member coupled to the releasable connection system. The releasable connection system may comprise a thread system configured to unravel in response to a tensile force applied to the flexible member.

In various embodiments, the multipurpose indicator tube may be configured to support the canopy and maintain a distance between the canopy and a sliding surface of the slide portion.

In various embodiments, the detachable restraint may comprise at least one of a hook-and-loop type fastener, a snap-fastener, or lacing. In various embodiments, a second end of the multipurpose indicator tube may be coupled to a first longitudinal tube of the slide portion and the detachable restraint may be attached to a second longitudinal tube of the slide portion.

In various embodiments, the first restraint portion may be configured to decouple from the second restraint portion in response to an internal pressure of the slide portion exceeding a predetermined pressure threshold. In various embodiments, the first end of the multipurpose indicator tube may be configured to pivot away from the first longitudinal tube in response to the first restraint portion decoupling from the second restraint portion.

A method of making an off-wing evacuation system is also disclosed herein. In accordance with various embodiments, the method may comprise coupling a multipurpose indicator tube to a first longitudinal tube of an inflatable slide, attaching a releasable restraint between a first end of the multipurpose indicator tube and a toe end of the inflatable slide, and attaching a detachable restraint to a second longitudinal tube of the inflatable slide. The detachable restraint may be configured to detachably couple to the first end of the multipurpose indicator tube.

In various embodiments, the method may further comprise coupling a releasable support strap to a ramp portion of the inflatable slide and a slide portion of the inflatable slide, and coupling a release assembly to the releasable support strap. The releasable support strap may be configured to release tension from between the ramp portion and the slide portion such that an angle of the slide portion relative to the ramp portion changes in response to the release of tension from between the ramp portion and the slide portion. The ramp portion may remain affixed to the slide portion after the release of tension from between the ramp portion and the slide portion.

In various embodiments, the method may further comprise configuring a first restraint portion of the releasable restraint to decouple from a second restraint portion of the releasable restraint in response to an internal pressure of the inflatable slide exceeding a predetermined pressure threshold, and configuring the detachable restraint to detachably couple to the first restraint portion. The first restraint portion may be attached to the first end of the multipurpose indicator tube.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the figures, wherein like numerals denote like elements.

FIGS. 2C and 2D illustrate a releasable connection system for a releasable support strap, in accordance with various embodiments;

DETAILED DESCRIPTION

The detailed description of various embodiments herein makes reference to the accompanying drawings, which show various embodiments by way of illustration. While these various embodiments are described in sufficient detail to enable those skilled in the art to practice the disclosure, it should be understood that other embodiments may be realized and that logical, chemical, and mechanical changes may be made without departing from the spirit and scope of the disclosure. Thus, the detailed description herein is presented for purposes of illustration only and not of limitation. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected, or the like may include permanent, removable, temporary, partial, full, and/or any other possible attachment option. Additionally, any reference to without contact (or similar phrases) may also include reduced contact or minimal contact.

Surface shading and/or cross hatching lines may be used throughout the figures to denote different parts but not necessarily to denote the same or different materials. Throughout the present disclosure, like reference numbers denote like elements. Accordingly, elements with like element numbering may be shown in the figures, but may not be necessarily repeated herein for the sake of clarity. As used herein, "proximate" refers to a direction inward, or generally, towards the reference component.

Off-wing evacuation systems of the present disclosure may include inflatable slides having a multipurpose readiness indicator. The inflatable slides may deploy over a wing of the aircraft and may include a ramp portion and a slide portion. A first end of the multipurpose readiness indicator is releasably coupled to the inflatable slide. The first end of the multipurpose readiness indicator is configured to pivot to a deployed position when the slide is fully inflated and ready for passengers. In the event of a water landing, the inflatable slide may be detached from the aircraft and used as a life raft. When in raft mode, the first end of the multipurpose readiness indicator may be detachably coupled to an opposing side rail of the inflatable slide to serve as a canopy support. Thus, in slide mode, the multipurpose readiness indicator decouples from the slide to signal to evacuees that the inflatable slide is ready for use, reducing occurrences of evacuees entering the slide before it is fully inflated, and in the event of a water landing, the multipurpose readiness indicator may be recoupled to the inflatable slide to serve as a canopy support.

Figure 1:
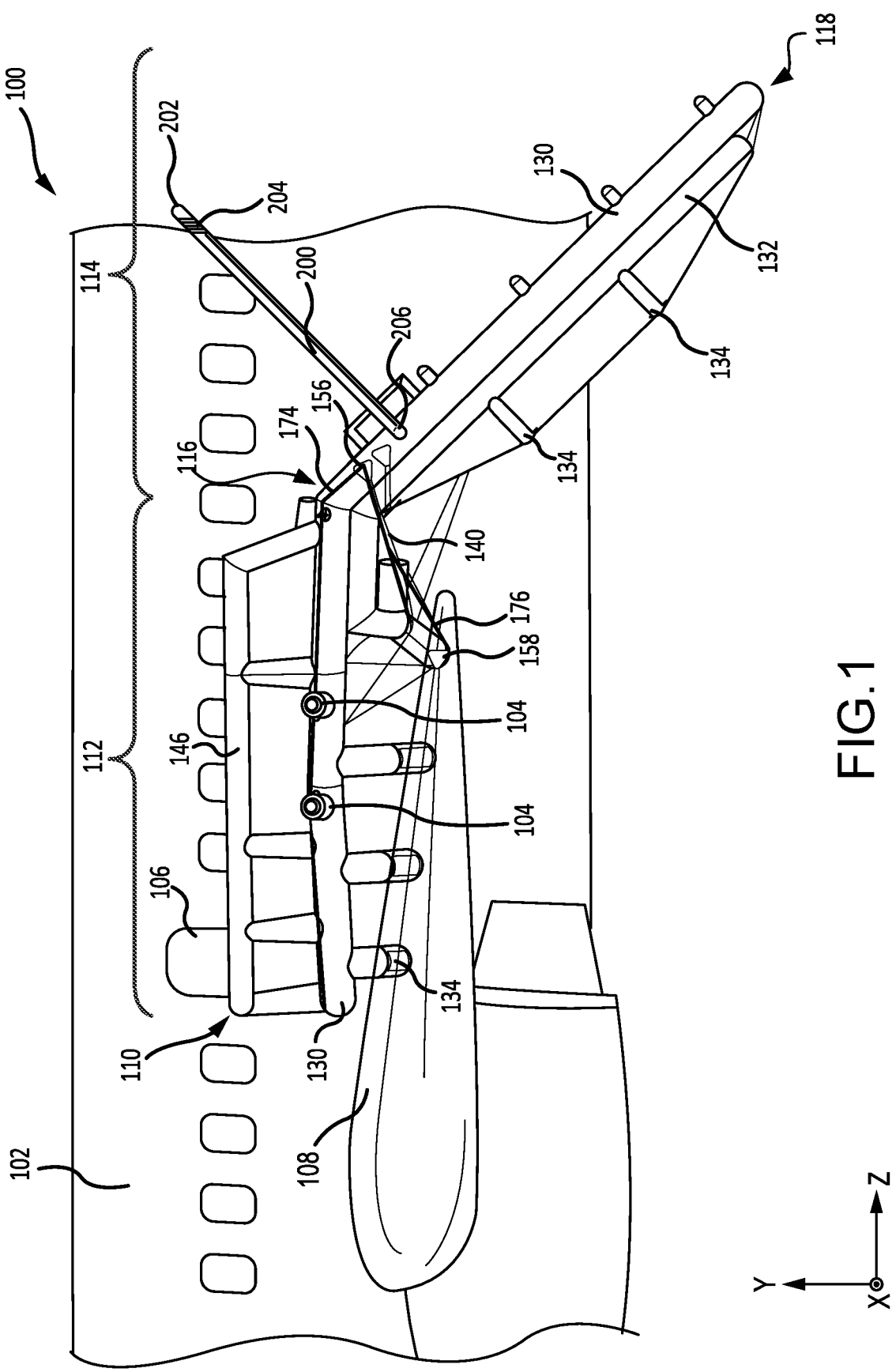
FIG. 1 illustrates a side view of an off-wing evacuation system in slide mode and having a multipurpose readiness indicator in a deployed position, in accordance with various embodiments.

With reference to FIG. 1, an off-wing evacuation system 100 in slide mode and having a multipurpose readiness indicator 200 in a deployed position is illustrated. In accordance with various embodiments, off-wing evacuation system 100 may deploy from an aircraft 102. Off-wing evacuation system 100 may include an inflatable slide 110. According to various embodiments, inflatable slide 110 may be used for emergency evacuation of aircraft 102 and may be configured to pack within a compartment of the aircraft 102 (e.g., in an aircraft door, a slide bustle, etc.). Inflatable slide 110 may be positioned near an exit door 106 of aircraft 102. In various embodiments, exit door 106 may be located over a wing 108 of aircraft 102. In the event of an emergency, exit door 106 may be opened by a passenger or crew member of aircraft 102. Inflatable slide 110 may deploy in response to the passenger or crew member opening exit door 106. In various embodiments, inflatable slide 110 may deploy in response to another action taken by a passenger or crew member such as, for example, depression of a button or actuation of a lever.

Off-wing evacuation system 100 may include an inflation source 104 coupled to inflatable slide 110 and configured to inflate inflatable slide 110. Inflation source 104 may include one or more aspirators and compressed fluid sources, which may include a compressed gas tank, an inflation cylinder, pyrotechnic apparatus, or other suitable inflation device. Upon deployment, inflation source 104 may deliver a pressurized fluid (such as in a gaseous state) to fill inflatable slide 110 with the pressurized fluid. Aspirators may draw gas from the environment through the aspirator and may direct the environmental gas into the inflatable slide 110. In response to receiving the pressurized fluid and the environmental gas, inflatable slide 110 may begin to inflate. In various embodiments, inflatable slide 110 may be inflated during initial deployment to a pressure, for example, between 2 pounds per square inch (psi) or 13.8 kilopascals (kPA) and 5 psi (34.5 kPA), and more specifically, to a pressure of about 3 psi (20.7 kPA), wherein "about" in this context only means+/−0.5 psi.

Inflatable slide 110 may extend from exit door 106, and may comprise a ramp portion 112 and a slide portion 114. In an initial deployed state, shown in FIG. 1, inflatable slide 110 may operate as both a ramp and a slide (i.e., "slide mode") to permit egress of passengers from aircraft 102. Ramp portion 112 may be secured to aircraft 102, such as by a girt. Ramp portion 112 may extend across a portion of wing 108 to allow evacuees to walk or traverse across wing 108 to access slide portion 114 of inflatable slide 110. In this regard, evacuees may exit aircraft 102 onto wing 108, enter and walk across ramp portion 112, and then slide down the slide portion 114 to an exit surface. Ramp portion 112 may be generally horizontal, i.e., a walking surface may be generally in the x-z plane, and may also be slightly angled with respect to the x-z plane and conform to the surface geometry of wing 108.

In various embodiments, slide portion 114 may extend from ramp portion 112 and generally slope downward (in the negative y-direction) toward an exit surface. Slide portion 114 may comprise a head end 116. Head end 116 of slide portion 114 may be coupled to or integral with ramp portion 112. A toe end 118 of slide portion 114 may contact the exit surface. The exit surface may be, for example water, a runway, uneven terrain or other any other surface. Inflatable slide 110 may be removably coupled to the fuselage of aircraft 102. Inflatable slide 110 may be decoupled from aircraft 102 in response to being fully inflated or being manually detached in order to allow passengers and/or crew members to safely float away from the aircraft 102.

In various embodiments, inflatable slide 110 may comprise an upper chamber 130 and a lower chamber 132. In various embodiments, ramp portion 112 and slide portion 114 may comprise a continuous chamber. For example, upper chamber 130 may include a plurality of tubes forming one continuous gas fillable chamber, and lower chamber 132 may also include a plurality of tubes forming another continuous gas fillable chamber. Each of upper chamber 130 and lower chamber 132 may be configured to inflate in response to receiving pressurized gas from inflation source 104. In various embodiments, upper chamber 130 may be fluidly coupled to lower chamber 132. Upper chamber 130 and/or lower chamber 132 may include longitudinal tubes extending from head end 116 of slide portion 114 to toe end 118.

In various embodiments, ramp portion 112 and slide portion 114 may include transverse tubes 134 configured to support inflatable slide 110 against buckling under heavy load while in slide mode. Transverse tubes 134 may extend laterally between the longitudinal tubes of lower chamber 132 and/or the longitudinal tubes of upper chamber 130.

In slide mode, it is desirable for inflatable slide 110 to have sufficient rigidity or beam strength, when in an inflated state, for evacuees to jump onto the slide portion 114 of inflatable slide 110 and slide down. Upper chamber 130 and lower chamber 132 may each inflate to at least a minimum pressure to provide sufficient beam strength to operate as a slide. For example, a pressure of 3.0 psi (20.7 kPA) may be a minimum pressure desired within upper chamber 130 to achieve a desired beam strength. One or more releasable support straps 140 may couple to upper chamber 130, lower chamber 132, and/or transverse tubes 134 and may operate as tension members to support inflatable slide 110 against buckling under heavy loads. Releasable support straps 140 may maintain the position of ramp portion 112 and slide portion 114 while in slide mode.

Releasable support straps 140 may provide reinforcing tension and leverage for controlling undesired movement of the ramp portion 112 and/or slide portion 114, for example, while inflatable slide 110 operates in slide mode. Releasable support straps 140 may be coupled between ramp portion 112 and slide portion 114 to operate as tension links to reduce the relative motion between slide portion 114 and ramp portion 112. Releasable support straps 140 may be secured to upper chamber 130 of slide portion 114 at an anchor point 156, and to lower chamber 132 or transverse tube 134 of ramp portion 112 at an anchor point 158. Slide portion 114 may be oriented at angle ranging from 15 to 45 degrees relative to a horizontal plane (e.g., A-A' in FIG. 3A) extending from ramp portion 112, or more specifically, ranging from 20 to 40 degrees. Releasable support straps 140 may maintain the angle of slide portion 114 to provide a safe descent for evacuees sliding down slide portion 114.

Inflatable slide 110 includes a multipurpose indicator tube 200. In FIG. 1, multipurpose indicator tube 200 is shown in the deployed position. Multipurpose indicator tube 200 may be fluidly coupled to slide portion 114 of inflatable slide 110.

For example, multipurpose indicator tube 200 may be in fluid communication with upper chamber 130 and/or lower chamber 132. Upon inflation of slide portion 114, multipurpose indicator tube 200 will be inflated and will extend upwardly such that a first end 202 of multipurpose indicator tube 200 is located at or above a line of sight of a flight attendant or passenger located proximate exit door 106. Locating first end 202 of multipurpose indicator tube 200 at or above the line of sight allows the flight attendant or passenger to determine by sight from within the fuselage whether the slide portion 114 is inflated and extended to a position that allows the passengers to be evacuated safely from the aircraft. In various embodiments, a marking tape 204 may be wrapped around multipurpose indicator tube 200 proximate to first end 202 of multipurpose indicator tube 200. Marking tape 204 may increase the visibility of multipurpose indicator tube 200. Multipurpose indicator tube 200 is configured to allow flight attendants and passenger to look out exit door 106 of aircraft 102 and by observing the positions of multipurpose indicator tube 200 determine if slide portion 114, which is generally not visible from exit door 106, is in condition (e.g., sufficiently inflated) for evacuating passengers.

Figure 2A:
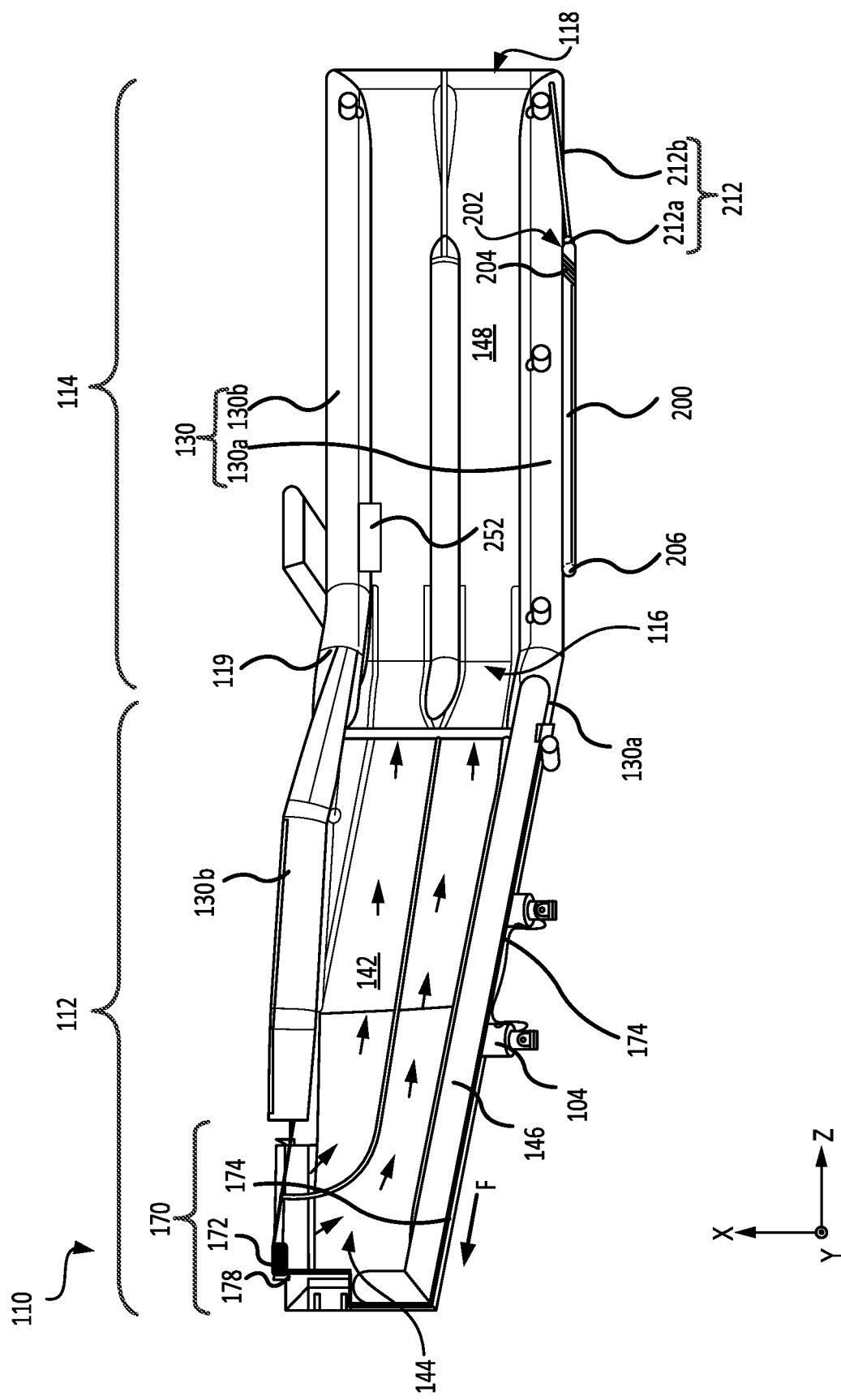
FIG. 2A illustrates a top view of an off-wing evacuation system in slide mode and having a multipurpose readiness indicator in a stowed position, in accordance with various embodiments.

Referring now to FIG. 2A, and with continued reference to FIG. 1, a top view of inflatable slide 110 of off-wing evacuation system 100 is shown. In various embodiments, upper chamber 130 may include longitudinal tubes 130a, 130b, which may be the upper chamber 130 of ramp portion 112 and slide portion 114. Longitudinal tubes 130a, 130b may be laterally spaced apart and may support a walking surface 142 and a sliding surface 148 therebetween. According to various embodiments, ramp portion 112 comprises walking surface 142, a proximal edge 144 forming the ramp entrance, and may include hand rails 146. Ramp portion 112 may be supported by wing 108, for example, ramp portion 112 may be configured to rest upon the wing 108. Slide portion 114 comprises sliding surface 148, which may be supported by upper chamber 130, lower chamber 132, and/or transverse tubes 134.

Figure 2B:
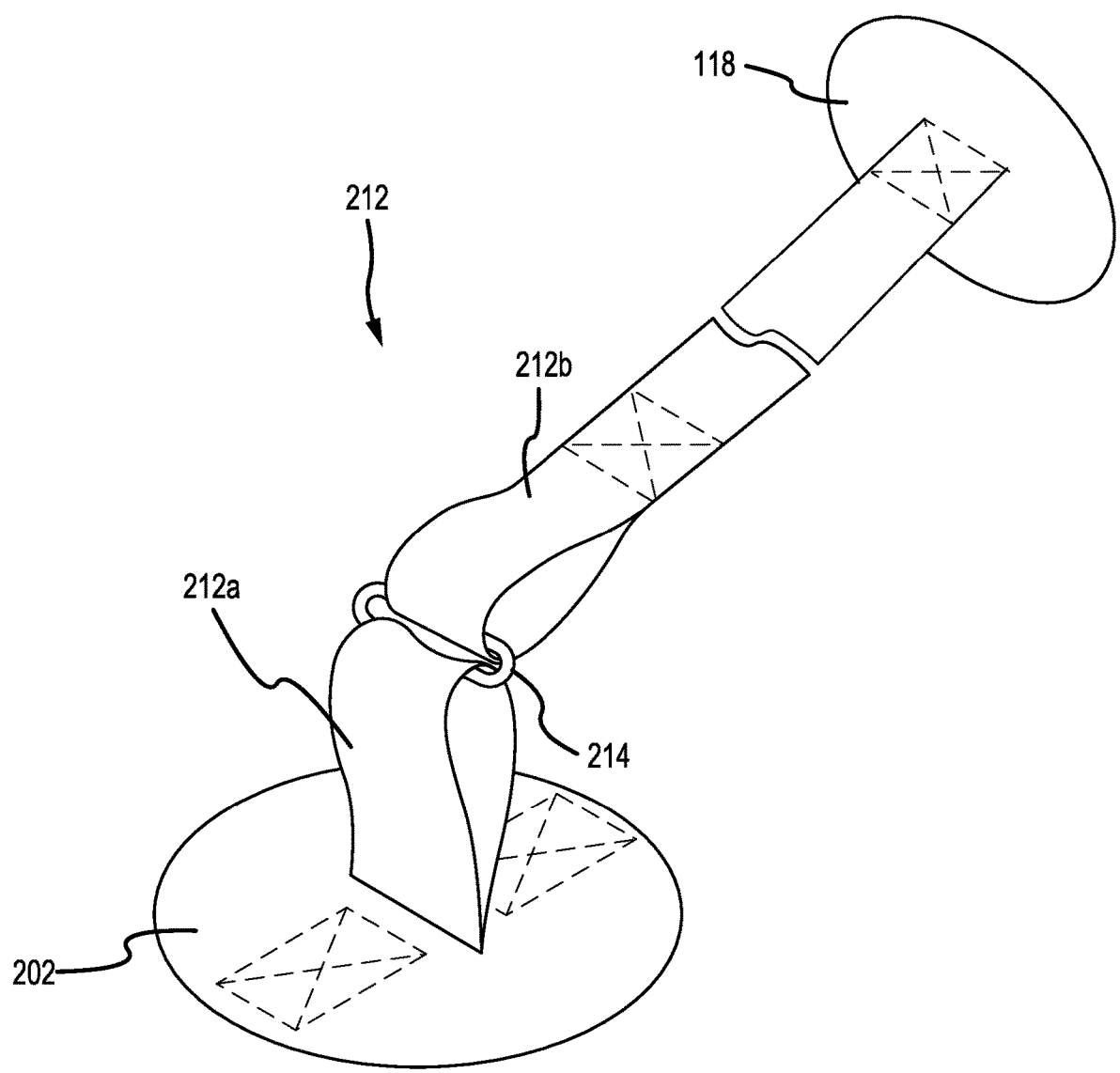
FIG. 2B illustrates a releasable restraint assembly for a multipurpose readiness indicator of an off-wing inflatable evacuation system, in accordance with various embodiments.

In FIG. 2A, multipurpose indicator tube 200 is shown in the stowed position. In various embodiments, a second end 206 of multipurpose indicator tube 200 is fluidly coupled to longitudinal tube 130a. In accordance with various embodiments, a releasable restraint 212 is disposed between first end 202 of multipurpose indicator tube 200 and toe end 118 of slide portion 114. Releasable restraint 212 may releasably couple multipurpose indicator tube 200 to toe end 118. For example, with combined reference to FIGS. 2A and 2B, a first restraint portion 212a of releasable restraint 212 may be attached to multipurpose indicator tube 200 and a second restraint portion 212b of releasable restraint 212 may be attached to toe end 118. First restraint portion 212a may be releasably coupled to second restraint portion 212b by a releasable connection system 214. In various embodiments, releasable connection system 214 may comprise a thread system. In various embodiments, releasable connection system 214 may comprise speed lacing, tape, snaps, hook and loop fasteners, or other disengagable fastening system. When first restraint portion 212a is coupled to second restraint portion 212b, first end 202 of multipurpose indicator tube 200 remains proximate longitudinal tube 130a. When first restraint portion 212a is decoupled from second restraint portion 212b, first end 202 of multipurpose indicator tube 200 may rotate away from longitudinal tube 130a (i.e., to the deployed position), as shown in FIG. 1.

In accordance with various embodiments, first restraint portion 212a is configured to decouple or otherwise disengage from second restraint portion 212b, in response to an internal pressure in slide portion 114 exceeding a predetermined threshold pressure. For example, in response to slide portion 114 being deployed, inflation source 104 may supply a flow of pressurized fluid to inflatable slide 110, thereby causing an internal pressure of inflatable slide 110 to increase. The increase in internal pressure may cause slide portion 114 to unfold, for example, toe end 118 may translate away from head end 116. In response to the internal pressure of slide portion 114 exceeding a predetermined threshold pressure and/or to translation of toe end 118 to a fully deployed position, first restraint portion 212a decouples from second restraint portion 212b, thereby allowing multipurpose indicator tube 200 to translate to the deployed position (e.g., allowing first end 202 of multipurpose indicator tube 200 to translate away from longitudinal tube 130a and toe end 118).

With continued reference to FIG. 1 and FIG. 2A, off-wing evacuation system 100 may comprise a release assembly 170, which may be configured to decouple inflatable slide 110 from aircraft 102 and to disengage one or more releasable support straps 140 to allow inflatable slide 110 to be used as a raft (i.e., "raft mode"). Release assembly 170 may be in operable communication with releasable support straps 140. In various embodiments, release assembly 170 may comprise an actuation structure 172, such as a handle, configured to cause one or more releasable support straps 140 to decouple from between ramp portion 112 and slide portion 114. Release assembly 170 may include a flexible member 174, and a releasable connection system 176. In various embodiments, actuation structure 172 may be located at a proximal end 178 of flexible member 174. Actuation structure 172 may comprise a pull handle, and release assembly 170 may be configured to be engaged or operated manually. In this regard, in response to a tensioning force being applied to actuation structure 172, flexible member 174 may release one or more releasable support straps 140. In this manner, a single handle may be provided to release a plurality of releasable support straps 140 of inflatable slide 110 to decouple the tension link of releasable support straps 140 from between ramp portion 112 and slide portion 114. Stated differently, release assembly 170 and releasable support straps 140 may be configured to allow the use of an off-wing evacuation system as a raft, for example, in the event of a water landing.

Release assembly 170 may be coupled to releasable support straps 140 and may be configured to release or de-couple the releasable support straps 140 in response to a tensile force F in flexible member 174 exceeding a selected threshold tensile force. In various embodiments, flexible member 174 may comprise a cable. Referring to FIGS. 2C and 2D, a releasable support strap 140 is shown, in accordance with various embodiments. Releasable support strap 140 may comprise a first strap portion 182 releasably coupled to a second strap portion 184. First strap portion 182 may be releasably coupled to second strap portion 184 by releasable connection system 176. In various embodiments, releasable connection system 176 may comprise a thread system. While releasable connection system 176 is illustrated as including thread system, it is further contemplated and understood that releasable connection system 176 may comprise speed lacing, tape, snaps, hook and loop fasteners, or other disengagable fastening system.

In various embodiments, flexible member 174 may be coupled to releasable support strap 140 at releasable connection system 176. Releasable connection system 176 may be disposed at any point along the length of releasable support strap 140 including at anchor point 156 or anchor point 158. Releasable connection system 176 may retain a first strap portion 182 of releasable support strap 140 to a second strap portion 184 of releasable support strap 140. First strap portion 182 of releasable support strap 140 may separate or decouple from second strap portion 184 of releasable support strap 140 in response to a tensile force F, imparted by flexible member 174, onto releasable connection system 176. Stated differently, releasable connection system 176 may disengage or uncouple in response to a tensile force F, imparted by flexible member 174, on releasable connection system 176. In the case of a thread system, the thread system may be stitched in a manner such that the tensile force F imparted by flexible member 174 onto the thread system may undo and/or break the stitching of the thread system. In this regard, releasable support strap 140 may be decoupled in response to flexible member 174 pulling the thread system.

FIG. 2D illustrates first strap portion 182 of releasable support strap 140 decoupled from second strap portion 184 of releasable support strap 140, with flexible member 174 having caused releasable connection system 176 to disengage. In this regard, releasable support strap 140 may be decoupled or released in response to actuation structure 172 (FIG. 2A) being pulled, which may allow inflatable slide 110 to flatten and to function as a raft (FIG. 3A).

Figure 3A:
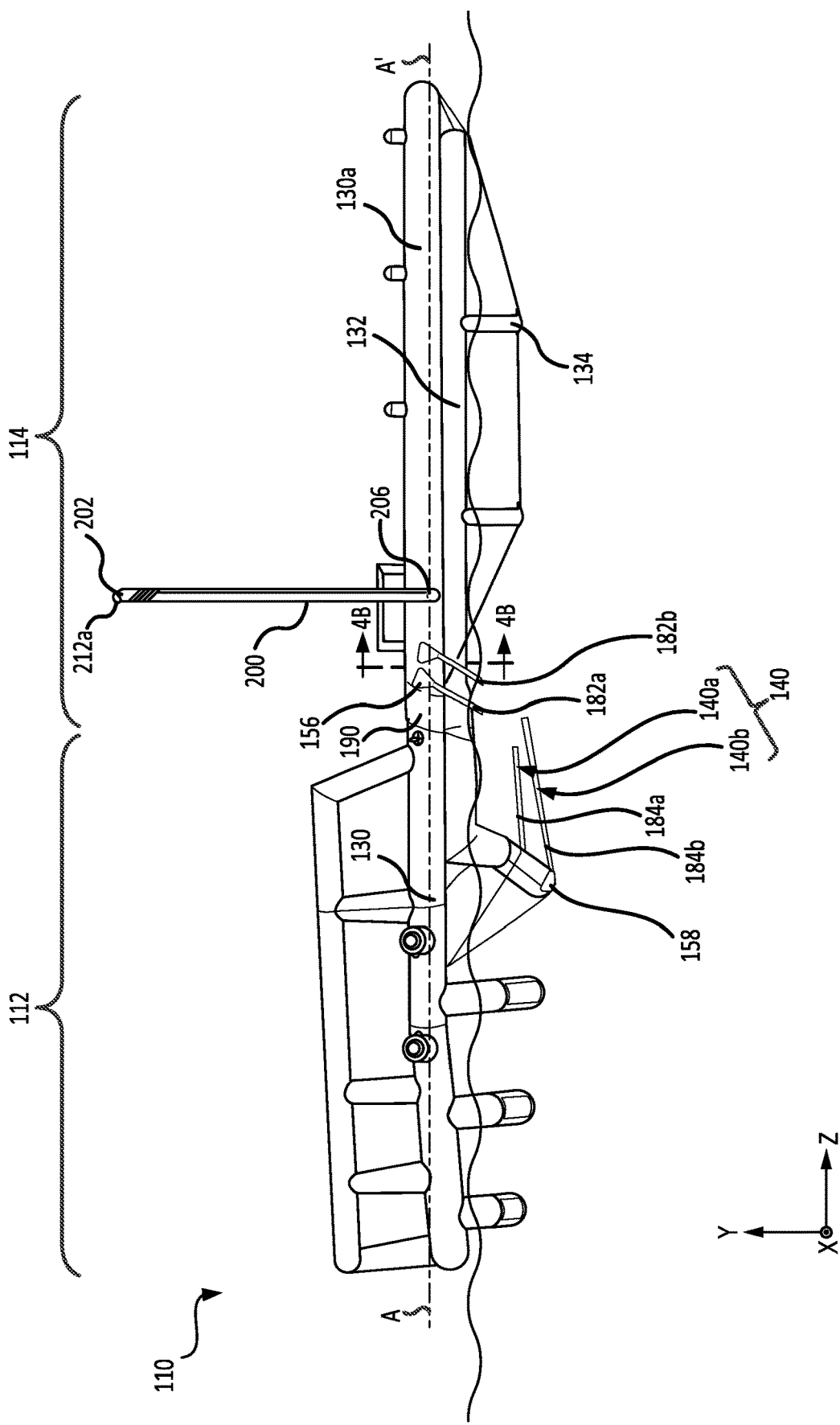
FIGS. 3A and 3B illustrate a side view and a cross-section view, respectively, of an off-wing evacuation system in raft mode with the multipurpose readiness indicator of the off-wing evacuation system in the deployed position, in accordance with various embodiments.
Figure 3B:
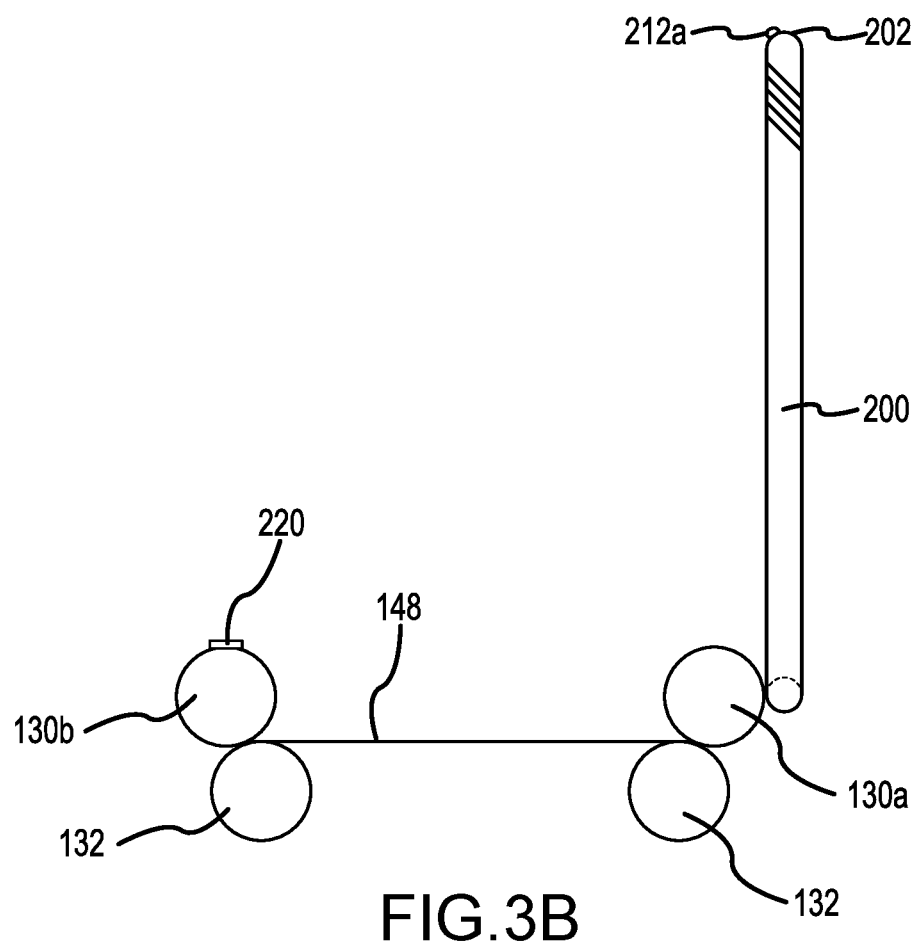

Referring to FIGS. 3A and 3B, inflatable slide 110 is shown in raft mode with multipurpose indicator tube in the deployed position. Inflatable slide 110 is shown with a plurality of releasable support straps 140, such as a first releasable support strap 140a and a second releasable support strap 140b, in a decoupled state. Release assembly 170 (FIG. 2A) coupled to the releasable support straps 140 may be manually engaged to release the tension link of releasable support straps 140 from between ramp portion 112 and slide portion 114. Upon decoupling releasable support straps 140, slide portion 114 and ramp portion 112 may move or rotate relative to each other at a flexible joint 190. Slide portion 114 and ramp portion 112 are configured to be disposed in a substantially parallel position in response to one or more of releasable support straps 140 being decoupled by the operation of release assembly 170.

In various embodiments, a first strap portion 182a detaches from a second strap portion 184a of first releasable support strap 140a. Similarly, a first strap portion 182b detaches from a second strap portion 184b of second releasable support strap 140b. With releasable support straps 140 decoupled, using for example release assembly 170 from FIG. 2A, the tension in releasable support straps 140 is reduced and slide portion 114 may rotate relative to ramp portion 112 until ramp portion 112 and slide portion 114 are substantially parallel. Once in raft mode, ramp portion 112 may be decoupled from aircraft 102 such that inflatable slide 110 may float away from aircraft 102.

Figure 4A:
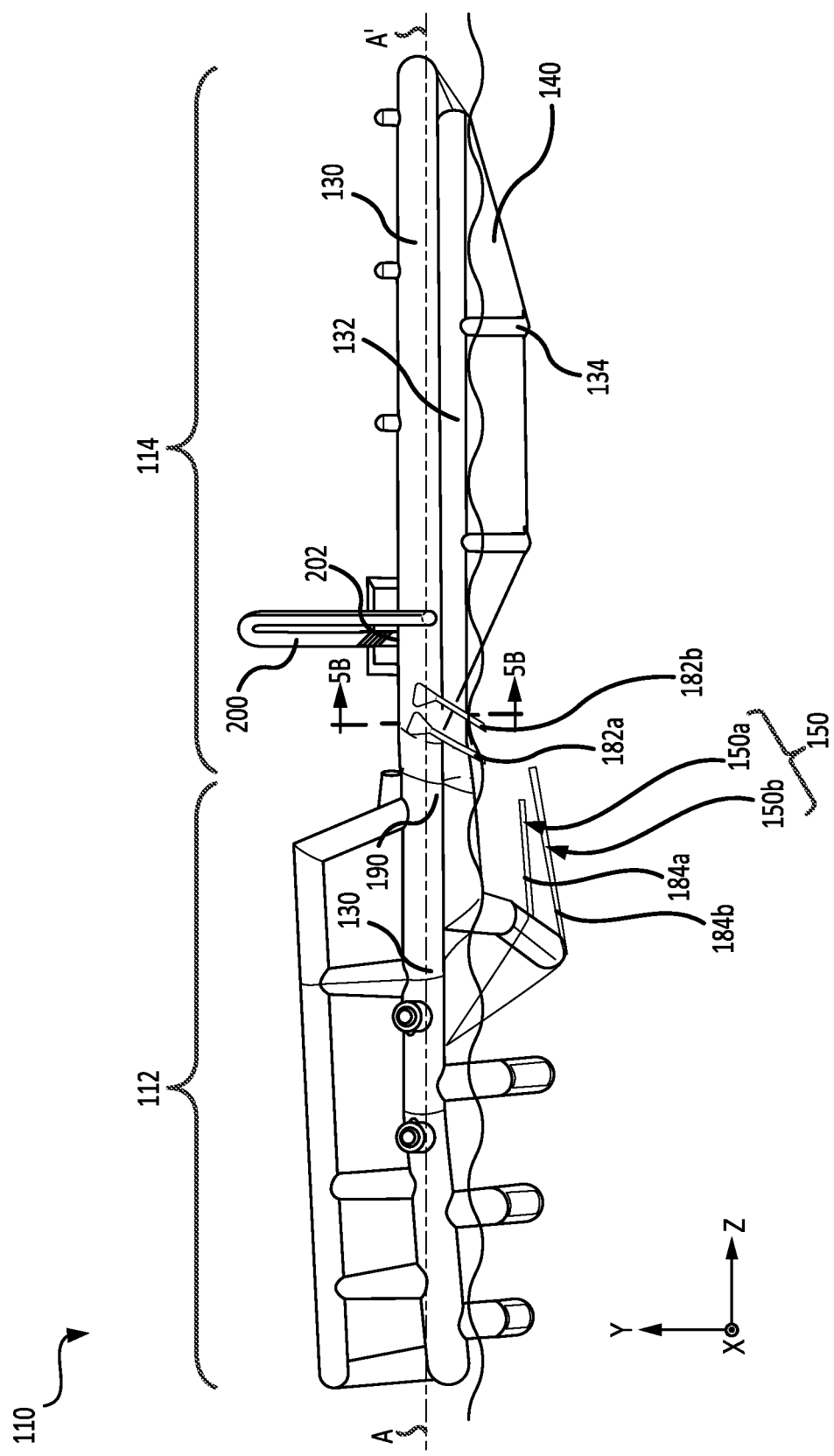
FIGS. 4A and 4B illustrate a side view and a cross-section view, respectively, of an off-wing evacuation system in raft mode with the multipurpose readiness indicator of the off-wing evacuation system in the canopy mode position, in accordance with various embodiments.
Figure 4B:
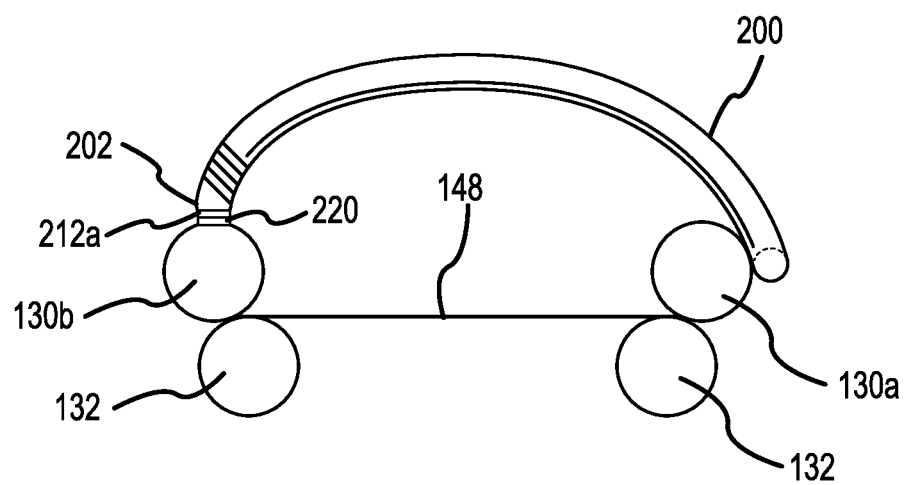
Figure 4C:
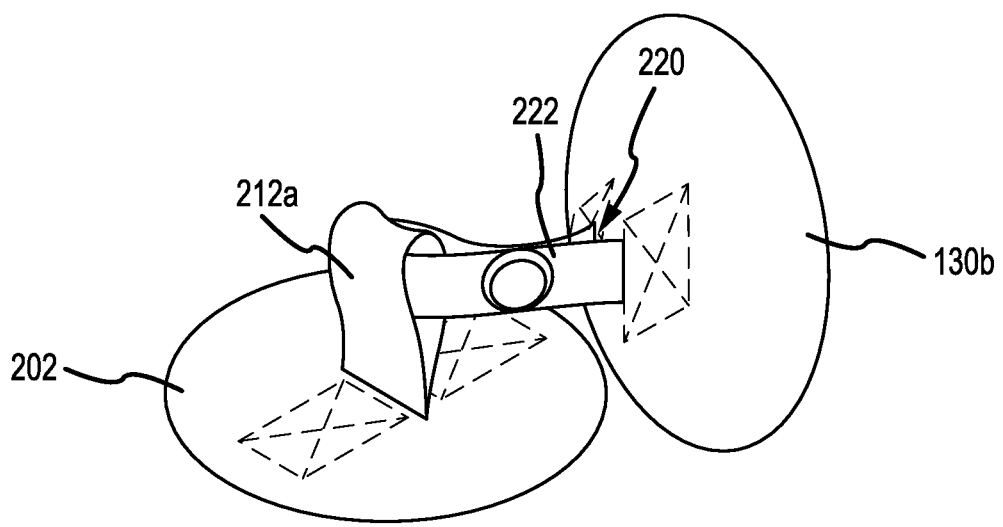
FIG. 4C illustrates a detachable restraint disposed between a multipurpose readiness indicator and the side rail of an off-wing evacuation slide, in accordance with various embodiments.

Referring to FIGS. 4A and 4B inflatable slide 110 is shown in raft mode with multipurpose indicator tube 200 in a canopy mode position. In accordance with various embodiments, a detachable restraint 220 is attached to slide portion 114 of inflatable slide 110. In various embodiments, detachable restraint 220 may be attached to longitudinal tube 130b of upper chamber 130. Detachable restraint 220 is configured to engage first end 202 of multipurpose indicator tube 200.

In accordance with various embodiments, first end 202 of multipurpose indicator tube 200 may be rotated toward detachable restraint 220 on the laterally opposite longitudinal tube 130b. Detachable restraint 220 is configured to engage first end 202 of multipurpose indicator tube 200. In various embodiments, detachable restraint may engage first restraint portion 212a of releasable restraint 212. For example, in various embodiments, first restraint portion may comprise a loop configured to receive strap 222 of detachable restraint 220. Strap 222 may be attached to itself via hook-and-loop fasteners, snap-fasteners, speed lacing, or other detachable fastener. A hook-and-loop type fastener (also referred to as a hook-and-pile fastener, touch fastener, or VELCRO®) is comprised of two sections, one section having an array of hook-like projections that engage an array of loop-like projections of a second section. A snap-fastener (also referred to as a press stud or a snap) is also comprised of two sections, one having a stud, projection, or lip that can be pressed into engagement with a complementary groove, receptacle, socket, or orifice to create a resistance and/or interference fit between the two sections. Lacing may comprise a lace threaded through openings defined by strap 222.

In various embodiments, detachable restraint 220 may include a first section of hook-and-loop material (e.g., one of either an array of hooks or an array of loops) or a first snap-fastener elements (e.g., either male studs or female receptacles) or first openings, and first end 202 of multipurpose indicator tube 200 may include a second section of hook-and-loop material (e.g., the other of the array of hooks or the array of loops) or second snap-fastener elements (e.g., the other of male studs or female receptacles), or a second set of openings. In various embodiments, detachable restraint 220 may include a first section of hook-and-loop material (e.g., one of either an array of hooks or an array of loops) or a first snap-fastener elements (e.g., either male studs or female receptacles) or first openings, and first restraint portion 212a may include a second section of hook-and-loop material (e.g., the other of the array of hooks or the array of loops) or second snap-fastener elements (e.g., the other of male studs or female receptacles), or a second set of openings.

In the event of a water landing, first end 202 of multipurpose indicator tube 200 may be coupled to slide portion 114 and may serve as a canopy support tube. For example, an evacuee may rotate first end 202 toward detachable restraint 220 and couple detachable restraint 220 to for example, first restraint portion 212a of (e.g., by engaging the first section of hook-and-loop material with the second section of hook-and-loop material, by engaging the first snap-fastener elements with the second snap-fastener elements, or by locating a lace through the first and second openings. In various embodiments, multipurpose indicator tube 200 may be configured such that, when first end 202 is coupled to longitudinal tube 130b, multipurpose indicator tube 200 may form an arc extending between longitudinal tube 130a and longitudinal tube 130b.

Figure 5A:
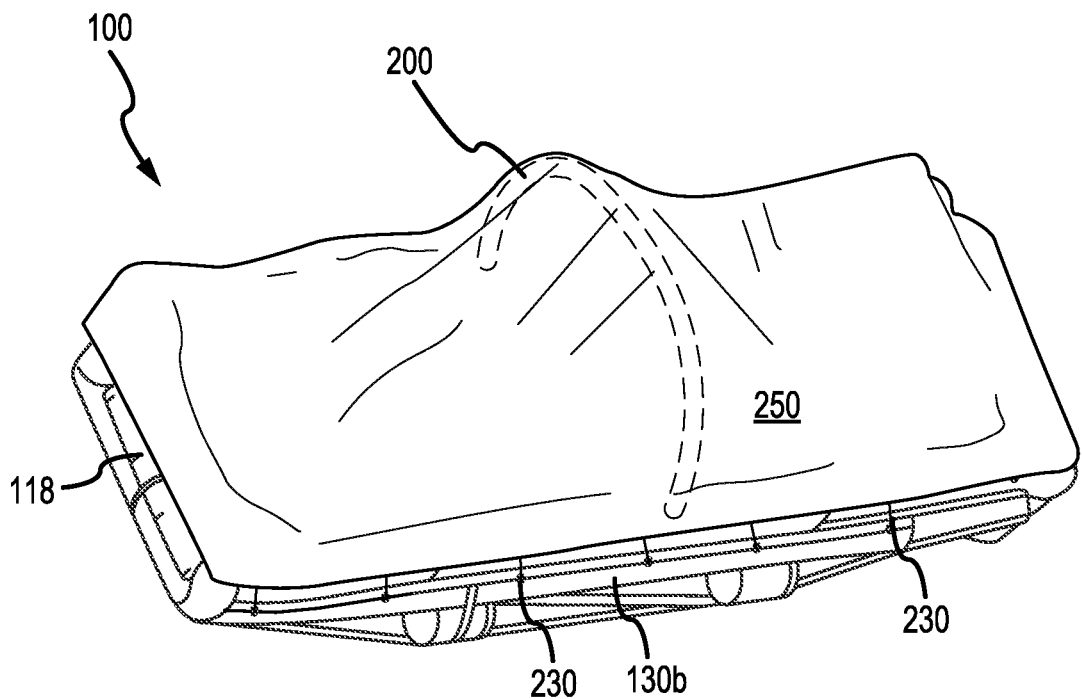
FIGS. 5A and 5B illustrate a perspective view and a cross-section view, respectively, of a canopy attached over a multipurpose readiness indicator of an off-wing evacuation system, in accordance with various embodiments.
Figure 5B:
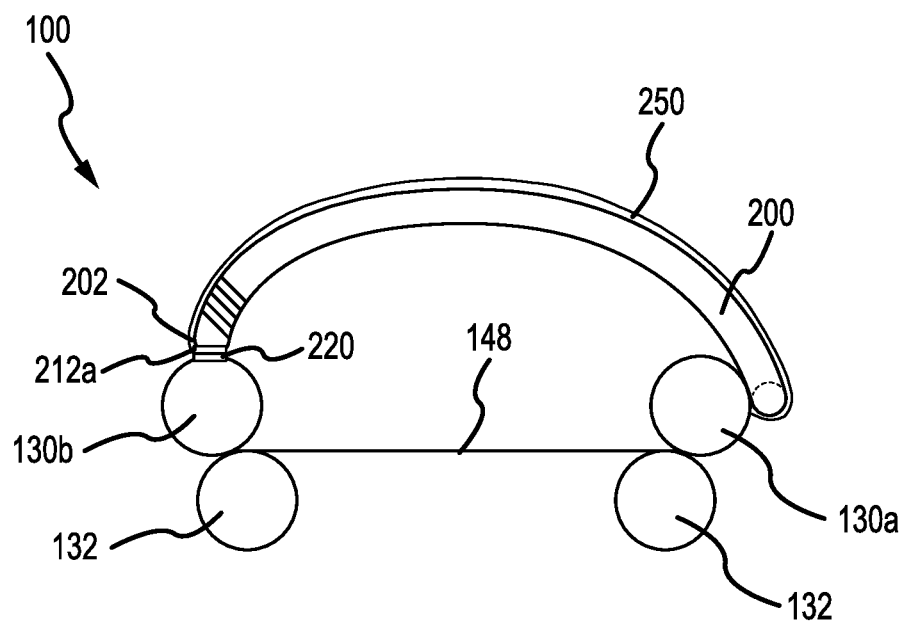

Referring to FIGS. 5A and 5B, off-wing evacuation system 100 may include a canopy 250. Canopy 250 may be included in a canopy kit 252 (FIG. 2A) stored on and/or attached to inflatable slide 110. Canopy 250 may be disposed over inflatable slide 110 to provide shelter and protect evacuees from rain, sun, and/or wind. Canopy 250 may be tied to longitudinal tubes 130a, 130b via ties 230. Multipurpose indicator tube 200 may support canopy 250 and maintain a desired distance between canopy 250 and sliding surface 148. In various embodiments, multipurpose indicator tube 200 may be maintained in an upright position by a compressive force applied to multipurpose indicator tube 200 by canopy 250. Stated another way, the tautness with which canopy 250 is tied to longitudinal tubes 130a, 130b may prevent multipurpose indicator tube 200 from translating toward sliding surface.

Figure 6:
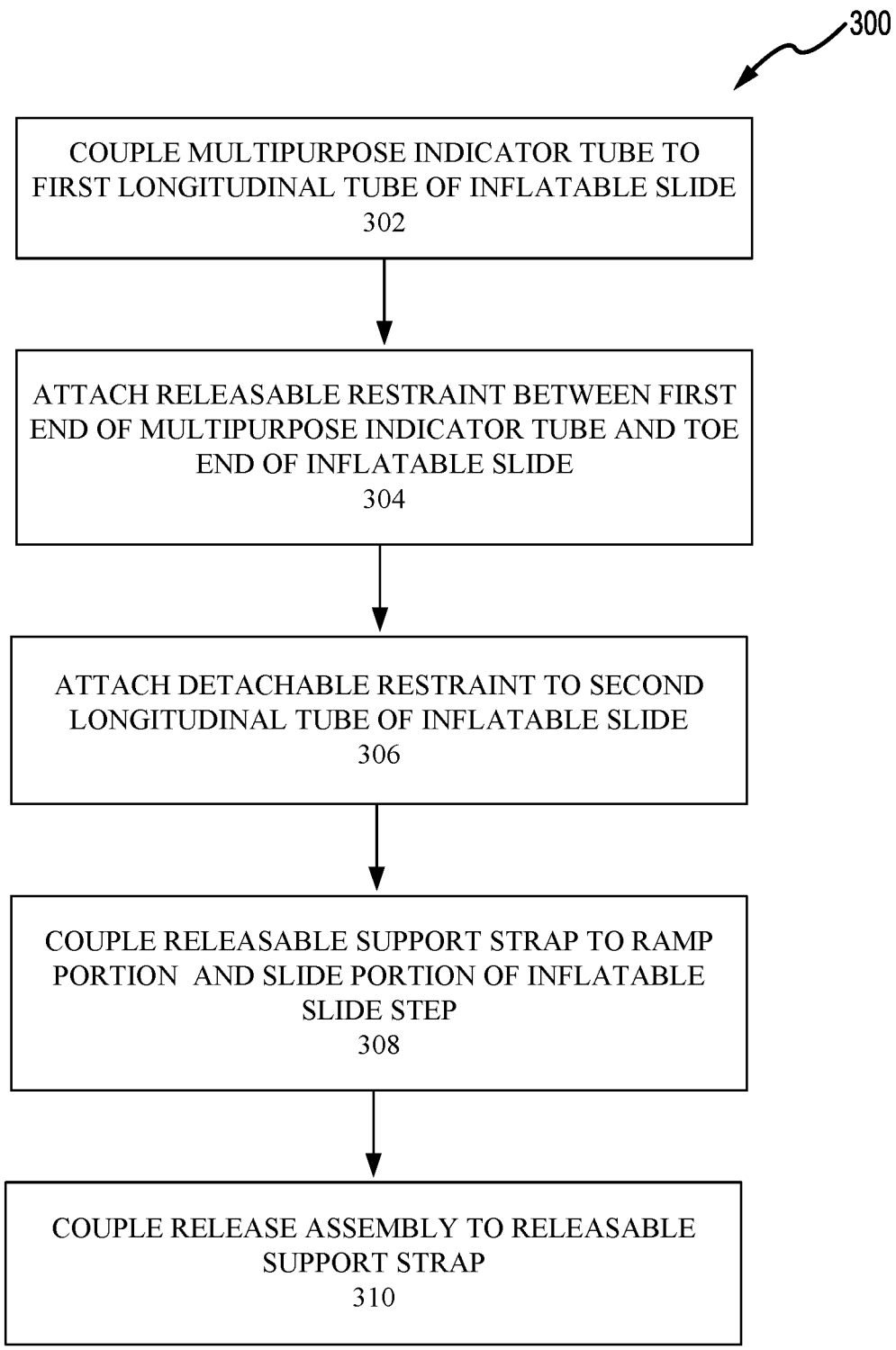
FIG. 6 illustrates a method of making an evacuation system, in accordance with various embodiments.

Referring to FIG. 6, a method 300 of making an off-wing evacuation system is illustrated. In accordance with various embodiments, method 300 may comprise coupling a multipurpose indicator tube to a first longitudinal tube of an inflatable slide (step 302), attaching a releasable restraint between a first end of the multipurpose indicator tube and a toe end of the inflatable slide (step 304), and attaching a detachable restraint to a second longitudinal tube of the inflatable slide (step 306). In various embodiments, the detachable restraint is configured to detachably couple to the first end of the multipurpose indicator tube.

In various embodiments, method 300 may further include coupling a releasable support strap to a ramp portion of the inflatable slide and a slide portion of the inflatable slide (step 308) and coupling a release assembly to the releasable support strap (step 310). In various embodiments, the releasable support strap is configured to release tension from between the ramp portion and the slide portion such that an angle of the slide portion relative to the ramp portion changes in response to the release of tension from between the ramp portion and the slide portion. In various embodiments, the ramp portion remains affixed to the slide portion after the release of tension from between the ramp portion and the slide portion.

In various embodiments, method 300 may further include configuring a first restraint portion of the releasable restraint to decouple from a second restraint portion of the releasable restraint in response to an internal pressure of the inflatable slide exceeding a predetermined pressure threshold. The first restraint portion is attached to the first end of the multipurpose indicator tube. In various embodiments, method 300 may further include configuring the detachable restraint to detachably couple to the first restraint portion.

Benefits and other advantages have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, and any elements that may cause any benefit or advantage to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods and apparatus are provided herein. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element is intended to invoke 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. An inflatable slide, comprising:
   a ramp portion;
   a slide portion extending from the ramp portion;
   a multipurpose indicator tube fluidly coupled to the slide portion;
   a releasable restraint disposed between the multipurpose indicator tube and the slide portion, the releasable restraint comprising a first restraint portion coupled to a first end of the multipurpose indicator tube and a second restraint portion coupled to a toe end of the slide portion, wherein the first restraint portion is releasably coupled to the second restraint portion; and
   a detachable restraint coupled to the slide portion and configured to detachably couple to the first end of the multipurpose indicator tube.

2. The inflatable slide of claim 1, further comprising:
   a releasable support strap coupled between the ramp portion and the slide portion; and
   a release assembly coupled to the releasable support strap, wherein the releasable support strap is configured to release tension from between the ramp portion and the slide portion such that an angle of the slide portion relative to the ramp portion changes in response to the release of tension from between the ramp portion and the slide portion, and wherein the ramp portion remains affixed to the slide portion after the release of tension from between the ramp portion and the slide portion.

3. The inflatable slide of claim 2, wherein the releasable support strap comprises a first strap portion coupled to a second strap portion by a releasable connection system.

4. The inflatable slide of claim 1, wherein the detachable restraint comprises at least one of a hook-and-loop type fastener, a snap-fastener, or lacing.

5. The inflatable slide of claim 1, wherein the detachable restraint is configured to detachably couple to the first restraint portion.

6. The inflatable slide of claim 1, wherein a second end of the multipurpose indicator tube is coupled to a first longitudinal tube of the slide portion and the detachable restraint is attached to a second longitudinal tube of the slide portion.

7. The inflatable slide of claim 6, wherein the multipurpose indicator tube is configured to form an arc extending between the first longitudinal tube and the second longitudinal tube.

8. The inflatable slide of claim 7, wherein the first restraint portion is configured to decouple from the second restraint portion in response to an internal pressure of the slide portion exceeding a predetermined pressure threshold.

9. The inflatable slide of claim 8, wherein the first end of the multipurpose indicator tube is configured to pivot away from the first longitudinal tube in response to the first restraint portion decoupling from the second restraint portion.

10. An off-wing evacuation system, comprising:
   an inflatable slide configured to be deployed from an aircraft, the inflatable slide comprising:
      a ramp portion;
      a slide portion extending from the ramp portion;
      a multipurpose indicator tube configured to pivot relative to the slide portion;
      a releasable restraint disposed between the multipurpose indicator tube and the slide portion, the releasable restraint comprising a first restraint portion coupled to a first end of the multipurpose indicator tube and a second restraint portion coupled to a toe end of the slide portion, wherein the first restraint portion is releasably coupled to the second restraint portion; and
      a detachable restraint coupled to the slide portion and configured to detachably couple to the first end of the multipurpose indicator tube; and
   a canopy configured to be coupled to the inflatable slide.

11. The off-wing evacuation system of claim 10, further comprising:
   a releasable support strap coupled between the ramp portion and the slide portion; and
   a release assembly coupled to the releasable support strap, wherein the releasable support strap is configured to release tension from between the ramp portion and the slide portion such that an angle of the slide portion relative to the ramp portion changes in response to the release of tension from between the ramp portion and the slide portion, and wherein the ramp portion remains affixed to the slide portion after the release of tension from between the ramp portion and the slide portion.

12. The off-wing evacuation system of claim 11, wherein the releasable support strap comprises a first strap portion coupled to a second strap portion by a releasable connection system, the release assembly further comprising a flexible member coupled to the releasable connection system, and wherein the releasable connection system comprises a thread system configured to unravel in response to a tensile force applied to the flexible member.

13. The off-wing evacuation system of claim 12, wherein the multipurpose indicator tube is configured to support the canopy and maintain a distance between the canopy and a sliding surface of the slide portion.

14. The off-wing evacuation system of claim 10, wherein the detachable restraint comprises at least one of a hook-and-loop type fastener, a snap-fastener, or lacing.

15. The off-wing evacuation system of claim 10, wherein a second end of the multipurpose indicator tube is coupled to a first longitudinal tube of the slide portion and the detachable restraint is attached to a second longitudinal tube of the slide portion.

16. The off-wing evacuation system of claim 15, wherein the first restraint portion is configured to decouple from the second restraint portion in response to an internal pressure of the slide portion exceeding a predetermined pressure threshold.

17. The off-wing evacuation system of claim 16, wherein the first end of the multipurpose indicator tube is configured to pivot away from the first longitudinal tube in response to the first restraint portion decoupling from the second restraint portion.

\* \* \* \* \*